US008209497B2

(12) United States Patent  
Kajigaya

(10) Patent No.: US 8,209,497 B2  
(45) Date of Patent: Jun. 26, 2012

(54) MULTI-PORT MEMORY AND SYSTEM USING THE SAME

(75) Inventor: Kazuhiko Kajigaya, Tokyo (JP)

(73) Assignee: Elpida Memory, Inc., Chuo-ku, Tokyo (JP)

( * ) Notice: Subject to any disclaimer, the term of this patent is extended or adjusted under 35 U.S.C. 154(b) by 575 days.

(21) Appl. No.: 12/382,600

(22) Filed: Mar. 19, 2009

(65) Prior Publication Data

US 2009/0240897 A1    Sep. 24, 2009

(30) Foreign Application Priority Data

Mar. 21, 2008    (JP) .............................. P2008-073614

(51) Int. Cl.  
*G06F 12/00* (2006.01)

(52) U.S. Cl. ........ 711/149; 370/351; 370/357; 370/358; 370/359; 370/360; 370/362

(58) Field of Classification Search .................. 711/149; 370/351, 357–360, 362  
See application file for complete search history.

(56) References Cited

U.S. PATENT DOCUMENTS

| | | | |
|---|---|---|---|
| 5,799,209 A | 8/1998 | Chatter | |
| 6,108,725 A | 8/2000 | Chatter | |
| 6,212,597 B1 | 4/2001 | Conlin et al. | |
| 6,504,752 B2 | 1/2003 | Ito | |
| 6,789,174 B2 | 9/2004 | Konishi et al. | |
| 7,505,353 B2 | 3/2009 | Kim et al. | |
| 2002/0080644 A1 | 6/2002 | Ito | |
| 2002/0184454 A1 | 12/2002 | Konishi et al. | |
| 2003/0135699 A1 | 7/2003 | Matsuzaki et al. | |
| 2005/0268023 A1 | 12/2005 | Briggs et al. | |
| 2007/0147162 A1* | 6/2007 | Kim et al. ................ | 365/230.05 |

FOREIGN PATENT DOCUMENTS

| | | |
|---|---|---|
| JP | 8-212766 A | 8/1996 |
| JP | 8-221319 A | 8/1996 |
| JP | 2000-501524 A | 2/2000 |
| JP | 2000-215659 A | 8/2000 |
| JP | 2001-43674 A | 2/2001 |
| JP | 2001-511559 A | 8/2001 |
| JP | 2002-197853 A | 7/2002 |
| JP | 2002-358232 A | 12/2002 |
| JP | 2003-263363 A | 9/2003 |
| JP | 2003-272378 A | 9/2003 |
| JP | 2005-346715 A | 12/2005 |
| JP | 2007-172811 A | 7/2007 |

* cited by examiner

*Primary Examiner* — Jasmine Song  
(74) *Attorney, Agent, or Firm* — McGinn IP Law Group, PLLC

(57) ABSTRACT

A multi-port memory, comprising: a memory array made of a plurality of memory cells arranged at intersection points between a plurality of bit lines and a plurality of word lines, the memory array being divided into n (an integer of 2 or greater) memory banks; m (an integer of 2 or greater) input/output ports, each independently performing input and output of a command, an address, data to and from each of the memory banks; and a route switching circuit that sets signal for the command, address, and data between the memory banks and the input/output ports, the route switching circuit controlling a connection state of signal lines between the plurality of input/output ports and the plurality of memory banks.

17 Claims, 13 Drawing Sheets

MULTI-PORT MEMORY AND SYSTEM USING THE SAME

BACKGROUND OF THE INVENTION

1. Field of the Invention

The present invention relates to a multi-port memory and a system using the same.

Priority is claimed on Japanese Patent Application No. 2008-073614, filed Mar. 21, 2008, the content of which is incorporated herein by reference.

2. Description of Related Art

For a memory accessed by a plurality of processors, a DRAM (Dynamic Random Access Memory) with a multi-port and multi-bank configuration and a control method thereof are conventionally known.

For example, as one example of conventional RAMs, a multi-port RAM is disclosed in Japanese Unexamined Patent Application, First Publication No. H08-221319 (Patent Document 1). This multi-port RAM includes: a plurality of memory banks, each capable of storing data; and a plurality of input/output ports that allow input and output of data, in which the plurality of input/output ports are coupled to the memory banks via different buses.

Furthermore, as another example of conventional RAMs, an SDRAM is disclosed in Japanese Unexamined Patent Application, First Publication No. 2000-215659 (Patent Document 2). This SDRAM includes: m banks, each including a memory cell region where memory cells are arranged, a row selection circuit for selecting a row in the memory cell region, and a column selection circuit for selecting a column in the memory cell; and n ports. This SDRAM further includes a multi-port circuit capable of accessing optional n banks from the n ports independently and simultaneously, where m≧n.

Furthermore, in conventional RAMs, a multi-port DRAM is disclosed in Japanese Unexamined Patent Application, First Publication No. 2002-197853 (Patent Document 3). This multi-port DRAM includes: a plurality of, for example N, external ports each of which receives a command; N sets of buses, each corresponding to each of the external ports; a plurality of memory blocks connected to the N sets of buses; and an address comparison circuit for comparing addresses accessed by a plurality of commands that are each input from the external N ports. This multi-port DRAM further includes a determination circuit for determining, when the address comparison circuit detects accesses to the same memory block through the address comparison, which command is to be executed and which command is not to be executed among the commands that access the same memory block.

Furthermore, in conventional RAMs, an SDRAM control circuit is disclosed in Japanese Unexamined Patent Application, First Publication No. 2003-263363 (Patent Document 4). This SDRAM control circuit includes: a plurality of ports that are connected to a plurality of independently accessible memories; selectors that allocate ports to be accessed based on an apportion bit, the apportion bit being a predetermined bit in a memory access request address from each of a plurality of masters; arbitration devices that arbitrate memory access requests from the plurality of masters, the memory access requests being allocated by the selectors each connected to each port; and access devices that control access to a memory according to contents of the memory access request of the master determined by the arbitration device connected to each of the ports.

Furthermore, in conventional RAMs, a DRAM-type multi-port memory is disclosed in Japanese Unexamined Patent Application, First Publication No. 2003-272378 (Patent Document 5). This DRAM-type multi-port memory includes: a cell array made of volatile memory cells and including a plurality of banks; a plurality of external ports each capable of accessing independent addresses of the cell array; an arbitration circuit that determines the order of access among the plurality of external ports; and a control circuit that outputs a busy signal to one of the plurality of the external ports if, at the time of an access request from the one port to one of the banks of the cell array, the one bank is executing a core operation.

Furthermore, in conventional RAMs, a multi-port RAM system is disclosed in Japanese Unexamined Patent Application, First Publication No. 2005-346715 (Patent Document 6). This multi-port RAM system includes: a plurality of memory banks, a plurality of buses, and a selection mechanism between the memory banks and the buses. This selection mechanism is connected to every memory bank in the plurality of memory banks and to every bus in the plurality of buses. The selection mechanism selects any memory bank from the plurality of memory banks, and allows the selected bank to be connected to any bus from the plurality of buses.

Furthermore, in conventional RAMs, a multi-port semiconductor memory is disclosed in Japanese Unexamined Patent Application, First Publication No. 2007-172811 (Patent Document 7). This multi-port semiconductor memory includes: a plurality of input/output ports different from one another; a memory array divided into a plurality of memory regions different from one another; and a selection control for variably controlling access routes between the memory regions and the input/output ports so that each of the memory regions is accessed via at least one of the input/output ports.

Furthermore, in conventional RAMs, a multi-port DRAM system is disclosed in Published Japanese Translation No. 2000-501524 of the PCT International Publication (Patent Document 8). This multi-port DRAM system for use in a system has a master bus controller having parallel ports and a DRAM each connected for access to a common bus interface. The multi-port DRAM system includes a multi-port internally-cached DRAM, and has a plurality of independent serial data interfaces each connected between a separate external I/O resource and an internal DRAM memory through corresponding buffers. A switching module is interposed between the serial data interfaces and the buffers. In addition, the internally-cached DRAM is controlled by the master bus controller so that a switching module logic dynamically makes a route between the serial interfaces and the buffers.

Furthermore, in conventional RAMs, a memory system is disclosed in Japanese Unexamined Patent Application, First Publication No. H08-212766 (Patent Document 9). This memory system includes: a plurality of memory blocks made of single-port memory cells; global bit lines with a multi-port configuration; and a switch device for selectively connecting bit lines in the memory blocks to the global bit lines, to thereby constitute a pseudo-multi-port memory with a high area efficiency.

Furthermore, in conventional RAMs, a multi-port DRAM is disclosed in Japanese Unexamined Patent Application, First Publication No. 2001-043674 (Patent Document 10). This multi-port DRAM includes: plural sets of common lines; plural sets of memory block groups, each of the groups being made of a plurality of memory blocks commonly connected to each shared line; a first port that accesses the memory blocks; a second port that accesses the memory blocks; a plurality of first switches that electrically connect or disconnect between the first port and the plural sets of common lines; a plurality of second switches that electrically connect or disconnect between the second port and the plural sets of common lines; and a switch control circuit that controls the first switches and the second switches, to thereby make it possible to evade increase in chip area.

However, the aforementioned DRAMs with a multi-port and multi-bank configuration disclosed in Patent Documents 1 to 10 have a problem in that it is not possible to perform a simultaneous write operation from one input/output port to a plurality of banks, and conversely, to perform a simultaneous read operation from one bank to a plurality of input/output ports.

On the other hand, as a configuration that solves the aforementioned problem, a memory access control apparatus is disclosed in Japanese Unexamined Patent Application, First Publication No. 2002-358232 (Patent Document 11). This memory access control apparatus performs memory access from both of a CPU as a first function device and a second function device to a memory, in which a memory address space is divided into a plurality of blocks so that each block has a continuous address region, and in which when the same memory block is accessed by the first and second function devices, the memory access control circuit allows simultaneous access by the first and second function devices to the memory if the accesses to the memory from both are for a read operation.

Furthermore, a multi-port DRAM is disclosed in Published Japanese Translation No. 2001-511559 of the PCT International Publication (Patent Document 12). This multi-port DRAM includes a multi-port internally-cached DRAM array, in which a plurality of system I/O resources are connected via common internal data buses connected to corresponding DRAM cores in each unit of the array, and in which, after one system I/O resource as a transmission source writes a message to the multi-port internally-cached DRAM array, this message is read and simultaneously transferred from the multi-port internally-cached DRAM array to all the system I/O resources that are required to receive this message.

However, the configuration described in the above Patent Document 11 has a problem in that it is not possible to simultaneously write the data which is input from one input/output port to each of the plurality of internal banks.

Furthermore, the configuration described in the above Patent Document 12 is for simply adapting a multi-cast to message interchange between the system I/O resources. This poses a problem in that, with a plurality of banks allocated to a plurality of MPUs or CPU cores, it is not possible to implement functions of a simultaneous write operation from one MPU or one CPU core to a plurality of banks, and conversely, a simultaneous read operation from one bank to a plurality of MPUs or CPU cores.

SUMMARY

In one embodiment, there is provided a multi-port memory of the present invention includes: a memory array made of a plurality of memory cells arranged at intersection points between a plurality of bit lines and a plurality of word lines, the memory array being divided into n (an integer of 2 or greater) memory banks; m (an integer of 2 or greater) input/output ports, each independently performing input and output of a command, an address, data to and from each of the memory banks; and a route switching circuit that sets signal for the command, address, and data between the memory banks and the input/output ports, the route switching circuit controlling a connection state of signal lines between the plurality of input/output ports and the plurality of memory banks.

In one embodiment, there is provided a computer system of the present invention includes: a multi-port memory comprising: a memory array made of a plurality of memory cells arranged at intersection points between a plurality of bit lines and a plurality of words, the memory array being divided into n (an integer of 2 or greater) memory banks; m (an integer of 2 or greater) input/output ports, each independently performing input and output of a command, an address, data to and from each of the memory banks; and a route switching circuit that optionally sets command, address, and data signal routes between the memory banks and the input/output ports, the route switching circuit controlling a connection state of signal lines between the plurality of input/output ports and the plurality of memory banks; and a multi-core processor made of a plurality of CPU cores, each connected to each of the input/output ports of the multi-port memory, wherein the command, the address, and the data are output from the CPU core.

In one embodiment, there is provided a computer system of the present invention includes: a processor; a plurality of memory banks; a plurality of data input/output portions each coupled to corresponding memory bank of the plurality of memory banks; a route switching circuit provided between the plurality of memory banks and the plurality of data input/output portions, connecting the plurality of memory banks to the plurality of data input/output portions respectively when the route switching circuit receives a first command from the processor, and connecting one of the plurality of memory banks to multiple data input/output portions when the route switching circuit receives a second command from the processor.

BRIEF DESCRIPTION OF THE DRAWINGS

The above features and advantage of the present invention will be more apparent from the following description of certain preferred embodiments taken in conjunction with the accompanying drawings, in which.

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
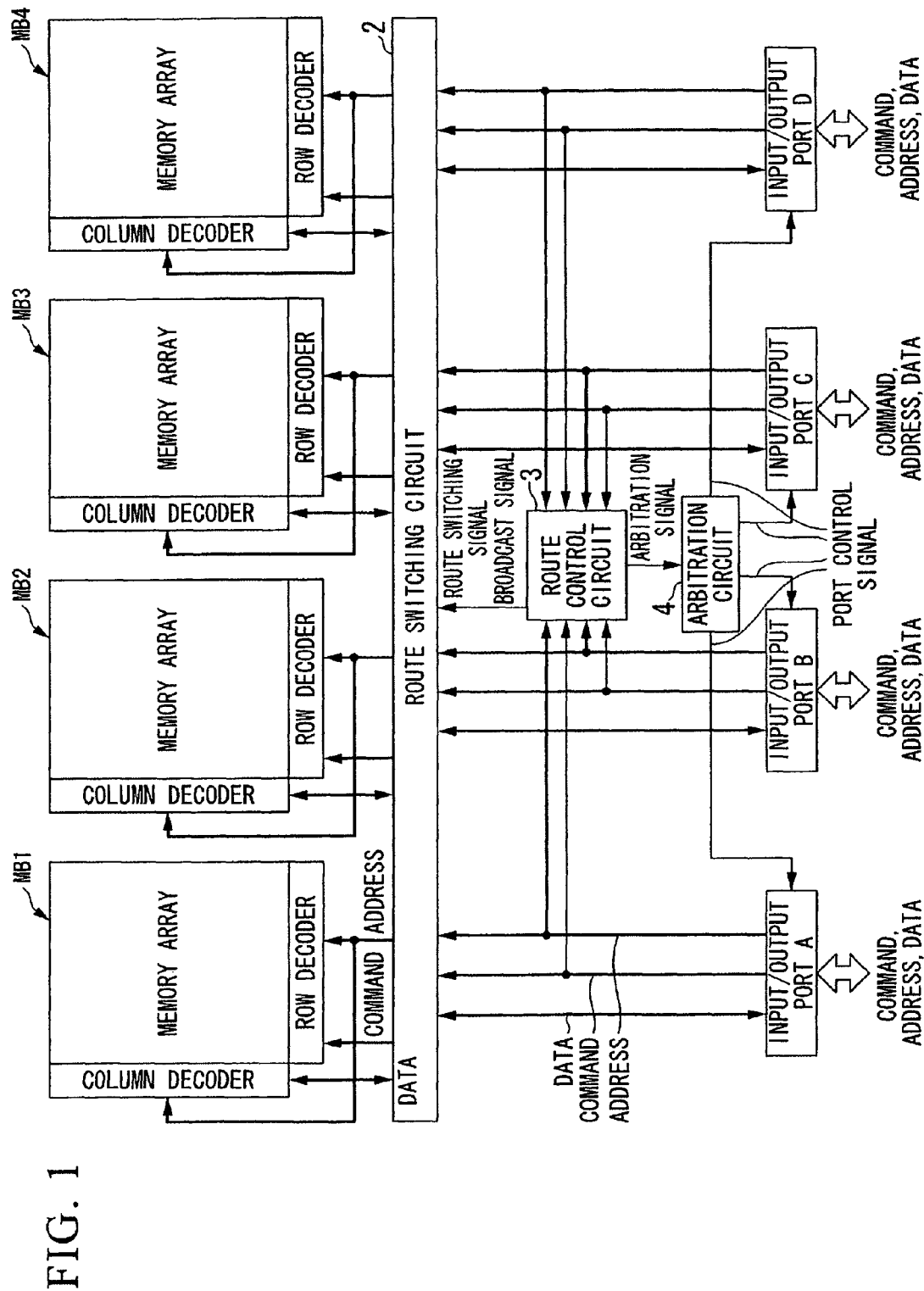
FIG. 1 shows an exemplary configuration of a multi-port memory according to a first embodiment of the present invention.

Hereunder is a description of a multi-port memory as a semiconductor storage apparatus according to one embodiment of the present invention, with reference to the drawings. FIG. 1 is an exemplary configuration of a multi-port memory according to the embodiment. Here the semiconductor storage apparatus of the present embodiment is one which is formed on a semiconductor substrate such as of a silicone.

The multi-port memory of the present embodiment is made of: n memory banks; and m input/output ports. However, for simplicity, the following description is made with n=4, m=4.

That is, the multi-port memory of the present embodiment shown in FIG. 1 is made of: four memory banks MB1, MB2, MB3, and MB4; a route switching circuit 2; a route control circuit 3; an arbitration circuit 4; and four input/output ports A, B, C, and D.

Each of the memory banks MB1 to MB4 independently has a memory cell region made of memory cells arranged at intersection points between a plurality of bit lines and a plurality of word lines. In the bank, there are arranged a row decoder and a column decoder for optionally selecting a memory cell from this memory cell region.

Furthermore, although not shown in the figure, in each of the memory banks MB1 to MB4, there are independently arranged: a clock generation circuit for generating a clock that is used to generate a timing for precharge of bit lines, data read, and data write; a timing control circuit that controls timing of operations of a precharge, a read, a write, and the like; a data read/write circuit including a sense amplifier that amplifies data information read by the bit lines; and the like. As a result, each of the memory banks MB1 to MB4 is capable of performing operations of precharge, data read, and data write, independently of one another.

To each of the input/output ports A, B, C, and D, a command signal, an address signal, and data are input from an external apparatus. For every input/output port, input and output of data from/to the external apparatus is independently performed by these command signal and address signal.

The route switching circuit 2 is capable of changing routes of reception/transmission of the command signal, the address signal, and the data between the input/output ports A, B, C, and D and the memory banks MB1, MB2, MB3, and MB4 by means of the route control circuit 3.

Figure 2:
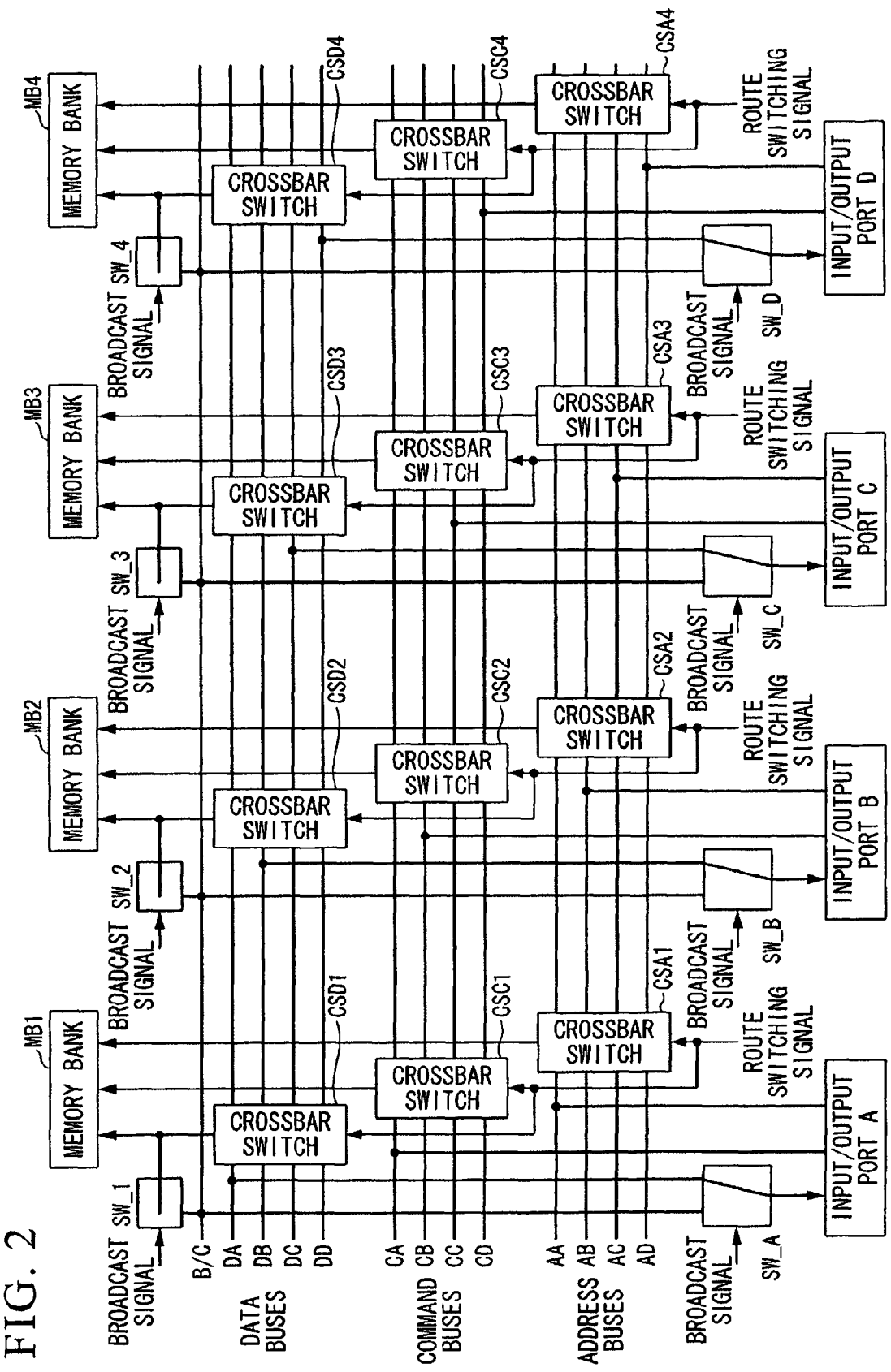
FIG. 2 is a block diagram showing a normal operation mode of a route switching circuit 2 of FIG. 1.

As shown in FIG. 2, the route switching circuit 2 includes: a crossbar switch group made of crossbar switch portions CSD1, CSD2, CSD3, CSD4, CSC1, CSC2, CSC3, CSC4, CSA1, CSA2, CSA3, and CSA4; a broadcast data line B/C; and a switch group of switches SW_1, SW_2, SW_3, SW_4, SW_A, SW_B, SW_C, and SW_D.

Each of the crossbar switch portions CSD1, CSD2, CSD3, and CSD4 is a switch for connecting data input and output lines (data buses made of a plurality of data lines) of the memory banks MB1, MB2, MB3, and MB4 to any of data buses DA, DB, DC, and DD of the input/output ports A, B, C, and D. Here, the data bus DA is a data bus connected to the input/output port A. The data bus DB is a data bus connected to the input/output port B. The data bus DC is a data bus connected to the input/output port C. The data bus DD is a data bus connected to the input/output port D.

Each of the crossbar switch portions CSC1, CSC2, CSC3, and CSC4 is a switch for connecting command input lines (command buses made of a plurality of command lines) of the memory banks MB1, MB2, MB3, and MB4 to any of the command buses CA, CB, CC, and CD of the input/output ports A, B, C, and D. Here, the command bus CA is a command bus connected to the input/output port A. The command bus CB is a command bus connected to the input/output port B. The command bus CC is a command bus connected to the input/output port C. The command bus CD is a command bus connected to the input/output port D.

Each of the crossbar switch portions CSA1, CSA2, CSA3, and CSA4 is a switch for connecting address input lines (address buses made of a plurality of address lines) of the memory banks MB1, MB2, MB3, and MB4 to any of the address buses AA, AB, AC, and AD of the input/output ports A, B, C, and D. Here, the address bus AA is an address bus connected to the input/output port A. The address bus AB is an address bus connected to the input/output port B. The address bus AC is an address bus connected to the input/output port C. The address bus AD is an address bus connected to the input/output port D.

The broadcast data line B/C is a data bus. With the switches SW_1, SW_2, SW_3, and SW_4 being turned to the ON state or the OFF state, the broadcast data line B/C is in a state of being connected/released to and from the data input and output lines of the memory banks MB1, MB2, MB3, and MB4.

Each of the switches SW_A, SW_B, SW_C, and SW_D is a selector switch that selects which is to be connected to the data input and output circuit (made of: a data waveform shaping circuit; a driver circuit; and the like) of the input/output ports A, B, C, and D: the corresponding data bus (DA, DB, DC, DD) or the broadcast data line B/C.

The broadcast data line B/C; the switches SW_1, SW_2, SW_3, and SW_4; and the switches SW_A, SW_B, SW_C, and SW_D constitute a broadcast switch portion.

With the aforementioned configuration, the multi-port memory of the present embodiment has the command buses CA, CB, CC, and CD, the address buses AA, AB, AC, and AD, and the data buses DA, DB, DC, and DD respectively of the input/output ports A, B, C, and D optionally connected to the memory banks MB1, MB2, MB3, and MB4 by means of the route switching circuit 2. The command signals and the address signals that are input from the input/output ports A, B, C, and D are transmitted to the memory banks MB1, MB2, MB3, and MB4 connected to the respective input ports.

Returning to FIG. 1, from the input/output ports, the command signals and the address signals corresponding to the respective input/output ports are input to the route switching control circuit 3. When a control signal for setting a route is input as a command from an external circuit (from the outside of the multi-port memory; for example, an MPU or a CPU core, or the like), the route switching control circuit 3 outputs to the route switching circuit 2 a route switching signal for setting routes between the input/output ports and the memory banks based on this control signal. The route switching control circuit 3 then on-off controls the aforementioned crossbar switch group and the aforementioned switch group with the route switching signal, to thereby optionally change routes between the input/output ports and the memory banks.

Furthermore, when the control signal denotes a broadcast control, the route switching control circuit 3 outputs a broadcast control signal to the route switching circuit 2, to thereby control the switches of the switch group. As a result, the route switching control circuit 3 sets routes between the memory banks and the input/output ports so that the broadcast mode is for either of the two broadcast transfers: a one-to-p ($2 \leq q \leq m$) broadcast data transfer for outputting data that has been read from any of the memory banks to a plurality of input/output ports; and a one-to-p ($2 \leq p \leq n$) broadcast data transfer for writing data that has been input from any of the input/output ports to a plurality of (memory cells of) memory banks.

Furthermore, the route switching control circuit 3 detects the simultaneous occurrence of accesses from two or more input/output ports to the same memory bank by comparing the address signals that are input from the input/output ports. If a plurality of accesses to the same memory bank is detected, the route switching control circuit 3 outputs an arbitration signal to the arbitration circuit 4.

When an arbitration signal is input from the route switching control circuit 3, the arbitration circuit 4 arbitrates operations of the input/output ports on a preset arbitration policy. For example, when address signals that access the same memory address are input, the arbitration circuit 4 controls the route switching circuit 2 with the command signal of the input/output port to which the address is first input, and outputs a busy signal to the other input/output ports, that is, the access request sources (MPUs or CPU cores) connected to the other input/output ports.

FIG. 2 is a block diagram showing an exemplary configuration of the route switching circuit 2 of FIG. 1. In FIG. 2, the switches SW_1 to SW_4 are in the OFF state, and none of the data buses DA, DB, DC, and DD is connected to the broadcast data line B/C. The data input and output circuits of the switches SW_A to SW_D are respectively connected to the corresponding data buses DA, DB, DC, and DD. That is, FIG. 2 shows routes in a normal operation state where the mode is not the broadcast mode, that is, the switch group in a state where no route for the broadcast data transfer is formed.

Figure 3A:
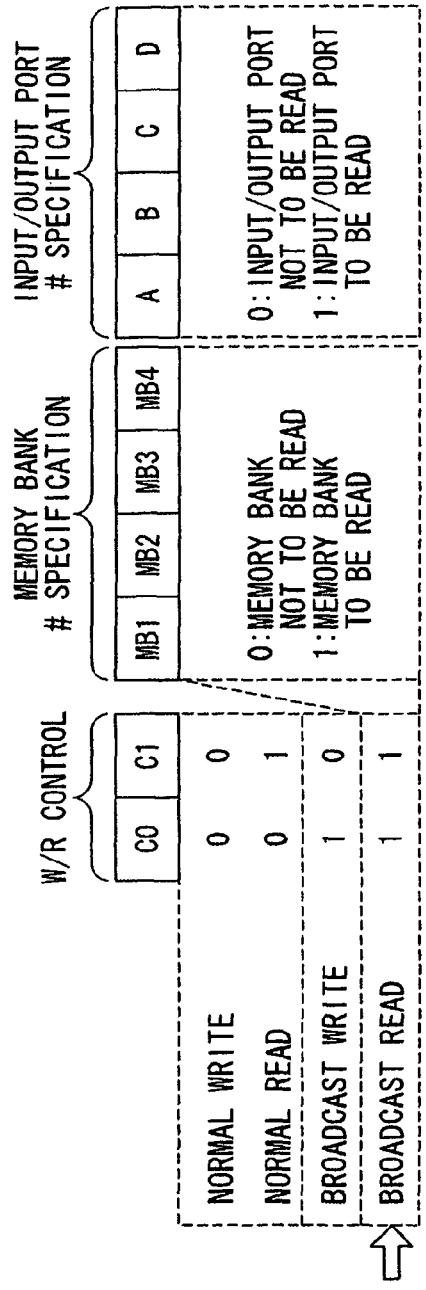
FIG. 3A is a conceptual diagram for explaining a command signal in a broadcast read mode.
Figure 3B:
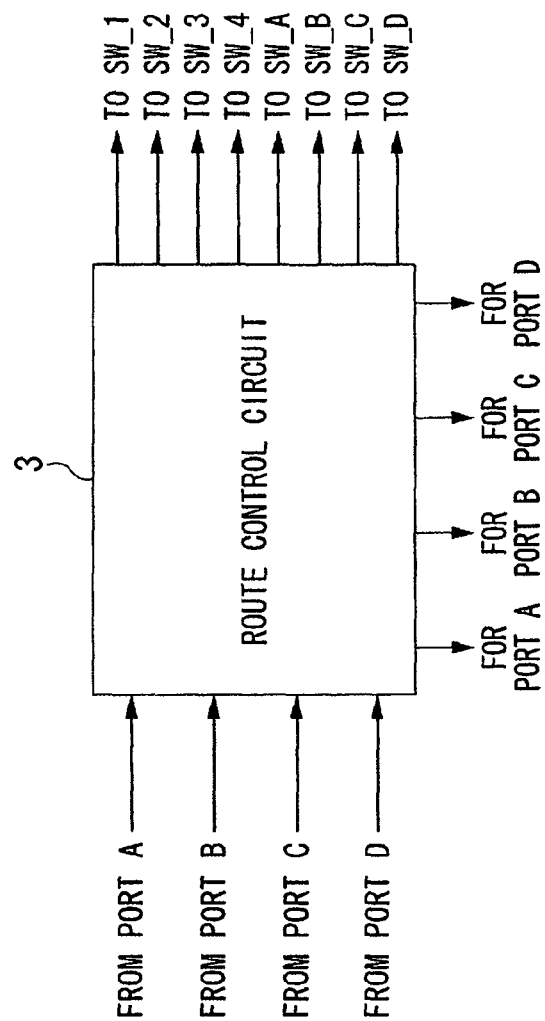
FIG. 3B is a conceptual diagram for explaining an exemplary operation of the route switching circuit of FIG. 1.

FIG. 3A and FIG. 3B are conceptual diagrams for explaining a broadcast read command, one of the control signals (commands) that changes the routes to those in the broadcast mode, the broadcast read command being input from an external circuit (MPU or CPU core). That is, the control signal is for specifying a broadcast mode where any of the memory banks is accessed and the same data is read from the single memory bank to a plurality of input/output ports. FIG. 3A is a conceptual diagram showing a configuration of a broadcast read command. FIG. 3B is a conceptual diagram showing an operation of the route control circuit 3 when a broadcast read command is input.

In FIG. 3B, to the route control circuit 3, broadcast command signals are input from the ports A, B, C, and D.

Furthermore, the route control circuit 3 outputs an arbitration signal to the ports A, B, C, and D, except the port that has issued a command. The arbitration signal is a signal for prohibiting access from the outside to the port specified as a port to be read.

Furthermore, the route control circuit 3 outputs a broadcast signal to the switches SW_1, SW_2, SW_3, SW_4, SW_A, SW_B, SW_C, and SW_D, to thereby perform switch selection control.

As shown in FIG. 3A, a W/R control code is a header code that shows a normal read or write state if C0 is "0"; and a broadcast read or write state if C0 is "1."

Furthermore, the W/R control code shows a write state if C1 is "0"; and a read state if C1 is "1."

Here, C0 is "1" and C1 is "1." Hence, the setting is for the broadcast read command to turn the mode to a broadcast read mode.

Memory bank # (number) specification codes are each provided with a setting bit corresponding to each of the memory banks MB1, MB2, MB3, and MB4. A setting bit of "0" denotes a memory bank from which data is not read. A setting bit of "1" denotes a memory bank from which data is read.

Input/output port # (number) specification codes are each provided with a setting bit corresponding to each of the input/output ports A, B, C, and D. A setting bit of "0" denotes an input/output port from which data is not read. A setting bit of "1" denotes an input/output port from which data is read.

When the broadcast read command shown in FIG. 3A is input from any of the input/output ports, the route control circuit 3 extracts the memory bank # specification codes from the broadcast read command. The route control circuit 3 compares them with the memory bank # setting codes corresponding to the preset memory bank numbers. The route control circuit 3 then outputs a broadcast control signal (switch on-off signal) to the route switching circuit 2, the broadcast control signal causing any of the switches SW_1 to SW_4 that correspond to the memory banks corresponding to the matched memory bank # setting codes to make a transition from the OFF state to the ON state.

The route switching circuit 2 then causes any of the switches SW_1 to SW_4 to make a transition from the OFF state to the ON state in correspondence to the broadcast control signal, to thereby connect the data input and output lines of the specified memory banks to the broadcast data line B/C.

The route control circuit 3 extracts the input/output port # specification codes from the broadcast read command. The route control circuit 3 compares them with the input/output port # setting codes corresponding to the preset input/output port numbers. The route control circuit 3 then outputs a broadcast control signal (switch selector signal) to the route switching circuit 2, the broadcast control signal causing the switches SW_A to SW_D that correspond to the input/output ports corresponding to the matched input/output port # setting codes to make a transition from the OFF state to the ON state.

Of the switches SW_A to SW_D, the route switching circuit 2 controls switching of the switches that are set in correspondence to the broadcast control signal. Thereby, the route control circuit 3 performs switching so that the connection of the data input and output circuits of the selected input/output ports is changed from the data buses (DA, DB, DC, DD) to the broadcast data line B/C.

With the aforementioned route switching of the route switching circuit 2 by the route control circuit 3, routes in a one-to-q broadcast read mode from a single memory bank to a plurality of input/output ports are established. At this time, the route control circuit 3 controls the crossbar switch portions of the crossbar switch group so that the command signals and the address signals are transmitted to the selected memory bank.

When the broadcast read command shown in FIG. 3A is input from any of the input/output ports, the route control circuit 3 prohibits access from the outside to the input/output ports specified as those for data read, except the port to which the broadcast read command has been input. Then, to the arbitration circuit 4, the route control circuit 3 outputs the port numbers of the input/output ports that output data and an arbitration signal for putting the input/output ports in the output state.

When the above arbitration signal is input, the arbitration circuit 4 prohibits access from the outside to the specified input/output ports, and also puts the specified input/output port in the output state in order to output the data that has been read from the specified memory bank.

Figure 4:
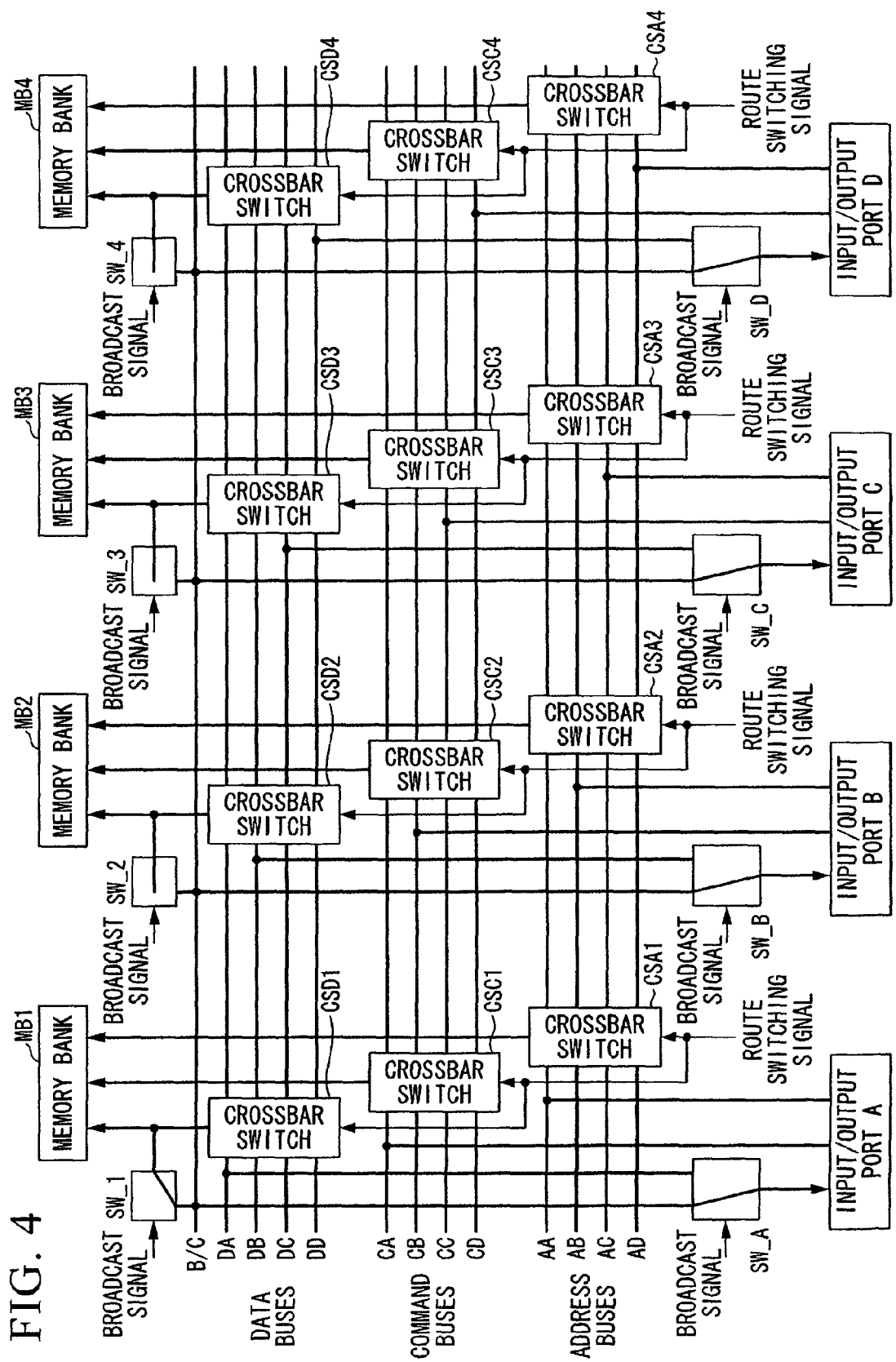
FIG. 4 is a conceptual diagram for explaining a process of reading data from a plurality of optional input/output ports, the data being read from an optional single memory bank.

FIG. 4 shows a state of the switches SW_1 to SW_4 and SW_A to SW_D when a broadcast read command of [C0, C1, MB1, MB2, MB3, MB4, A, B, C, D]=[1, 1, 1, 0, 0, 0, 1, 1, 1, 1] is input from any of the input/output ports, the broadcast read command denoting the direction of outputting the data read from the memory bank MB1 to all the input/output ports A to D.

With the broadcast control signal (switch on-off signal) from the route control circuit 3, the switch SW_1 is in the ON state in the route switching circuit 2. As a result, the data input and output line of the memory bank MB1 is connected to the broadcast data line B/C.

Furthermore, with the broadcast control signal (switch selector signal) from the route control circuit 3, the switches SW_A to SW_D switch the connection to the data input and output circuits in the route switching circuit 2 so that the data input and output circuits of the input/output ports A, B, C, and D are connected to the broadcast data line B/C.

With the arbitration signal from the route control circuit 3, the arbitration circuit 4 prohibits access from the outside to the ports of the input/output ports A, B, C, and D, except the port to which the broadcast read command has been input. Furthermore, the arbitration circuit 4 puts the specified input/output ports A, B, C, and D in the output state in order to output the data read from the specified memory bank MB1.

As a result, the data read from the memory bank MB1 is transmitted simultaneously to all the input/output ports A, B, C, and D, and is read to the outside.

Figure 5:
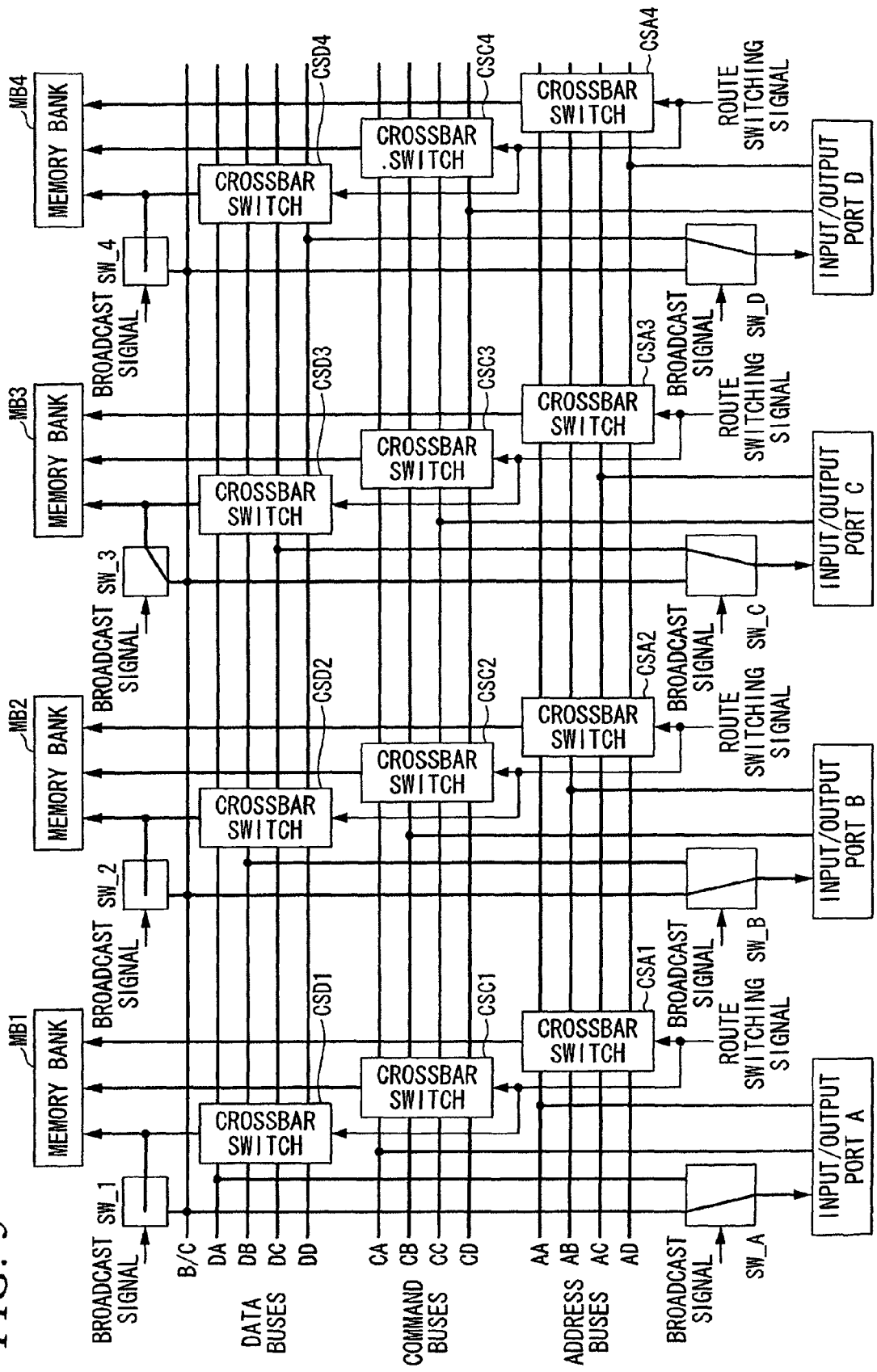
FIG. 5 is another conceptual diagram for explaining a process of reading data from a plurality of optional input/output ports, the data being read from an optional single memory bank.

FIG. 5 shows a state of the switches SW_1 to SW_4 and SW_A to SW_D when a broadcast read command of [C0, C1, MB1, MB2, MB3, MB4, A, B, C, D]=[1, 1, 0, 0, 1, 0, 1, 1, 0, 0] is input from, for example, the input/output port A, the broadcast read command denoting the direction of outputting the data read from the memory bank MB3 to the input/output ports A and B.

With the broadcast control signal (switch on-off signal) from the route control circuit 3, the switch SW_3 is put in the ON state in the route switching circuit 2. As a result, the data input and output line of the memory bank MB3 is connected to the broadcast data line B/C.

Furthermore, with the broadcast control signal (switch selector signal) from the route control circuit 3, the switches SW_A and SW_B switch the connection to the data input and output circuits in the route switching circuit 2 so that the data input and output circuits of the input/output ports A, B are connected to the broadcast data line B/C.

As a result, the data read from the memory bank MB3 is transmitted simultaneously to the input/output ports A and B, and is read to the outside.

In the case of the broadcast read mode of FIG. 5, the arbitration circuit 4 prohibits access from the outside to the specified input/output port B with the arbitration signal from the route control circuit 3, the input/output port B being other than the port to which the broadcast read command has been input. Furthermore, the arbitration circuit 4 puts the specified input/output ports A and B in the output state in order to output the data read from the specified memory bank MB3.

On the other hand, the data routes between the memory banks MB1, MB2, and MB4 and the input/output ports C and D are not subjected to access restriction by the arbitration circuit 4. As a result, based on the command signal and the address signal, the data routes are controlled by the route control circuit 3 so that normal access to the memory banks is performed by use of the crossbar switch portions of the crossbar switch group.

Figure 6A:
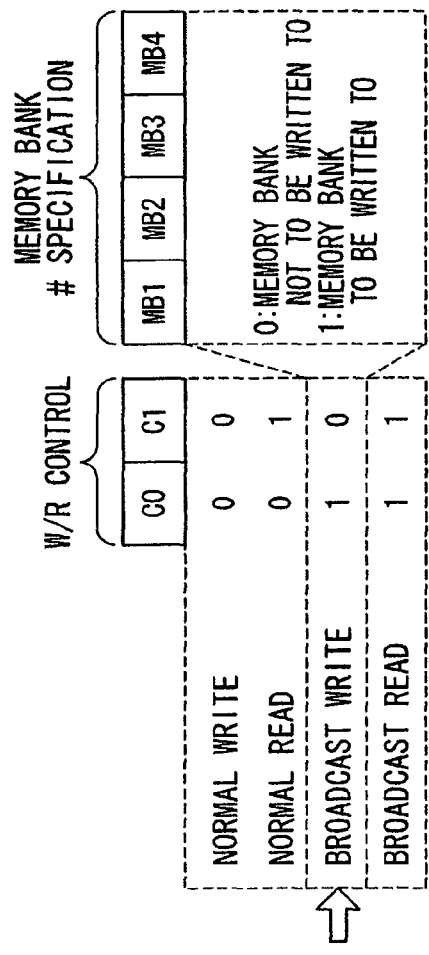
FIG. 6A is a conceptual diagram for explaining a command signal in a broadcast write mode.
Figure 6B:
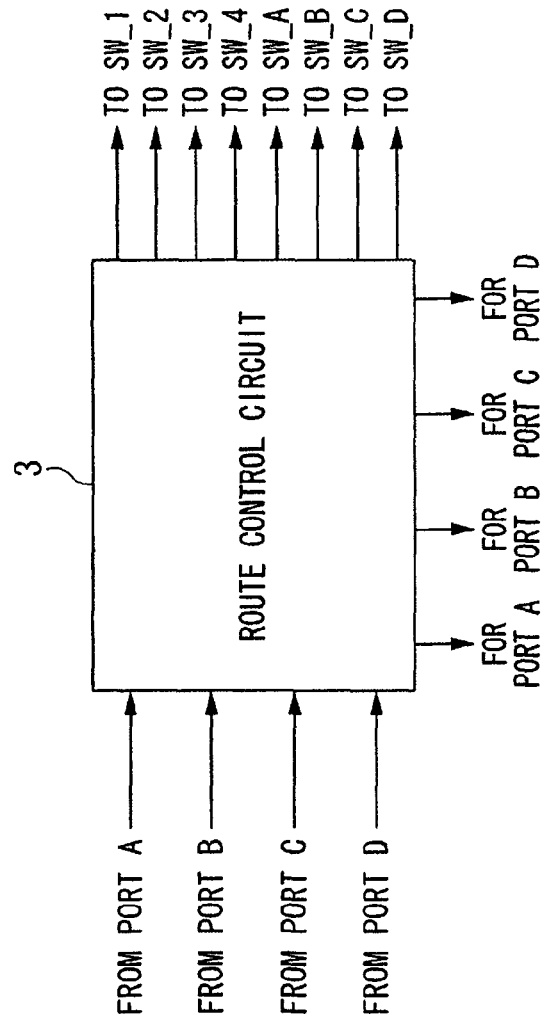
FIG. 6B is a conceptual diagram for explaining an exemplary operation of the route switching circuit of FIG. 1.

FIG. 6A and FIG. 6B are conceptual diagrams for explaining a broadcast write command, one of the control signals (commands) that change the routes to those in the broadcast mode, the broadcast write command being input from an external circuit (MPU or CPU core). That is, the control signal is for specifying a broadcast mode where a plurality of memory banks are accessed and the same data is written from any of the input/output ports to the plurality of memory banks. FIG. 6A is a conceptual diagram showing a configuration of a broadcast write command. FIG. 6B is a conceptual diagram showing an operation of the route control circuit 3 when a broadcast write command is input.

In FIG. 6B, to the route control circuit 3, a broadcast command signal is input from the ports A, B, C, and D.

Furthermore, the route control circuit 3 outputs an arbitration signal to the ports A, B, C, and D, except the port that has issued the command. The arbitration signal is a signal for prohibiting access from the outside to the port specified as a port to be read.

Furthermore, the route control circuit 3 outputs a broadcast signal to the switches SW_1, SW_2, SW_3, SW_4, SW_A, SW_B, SW_C, and SW_D, to thereby control the switching.

As shown in FIG. 6A, a W/R control code is a header code that shows a normal read or write state if C0 is "0"; and a broadcast read or write state if C0 is "1."

Furthermore, the W/R control code shows a write state if C1 is "0"; and a read state if C1 is "1."

Here, C0 is "1" and C1 is "0." Hence, the setting is for the broadcast write command to turn the mode to a broadcast write mode.

Memory bank # (number) specification codes are each provided with a setting bit corresponding to each of the memory banks MB1, MB2, MB3, and MB4. A setting bit of "0" denotes a memory bank to which data is not written. A setting bit of "1" denotes a memory bank to which data is written.

When the broadcast write command shown in FIG. 6A is input from any of the input/output ports, the route control circuit 3 extracts the memory bank # specification codes from the broadcast write command. The route control circuit 3 compares them with the memory bank # setting codes corresponding to the preset memory bank numbers. The route control circuit 3 then outputs a broadcast control signal (switch on-off signal) to the route switching circuit 2, the broadcast control signal causing the switches SW_1 to SW_4 that correspond to the memory banks corresponding to the matched memory bank # setting codes to make a transition from the OFF state to the ON state.

The route switching circuit 2 then causes the switches SW_1 to SW_4 to make a transition from the OFF state to the ON state in correspondence to the broadcast control signal.

Subsequently, the route switching circuit 2 connects the data input and output lines of the specified memory banks to the broadcast data line B/C.

Furthermore, to identify the input/output port to which the broadcast write command has been input, the route control circuit 3 uses a command issuing port identification signal, which will be described later, to output a broadcast control signal (switch selector signal) to the route switching circuit 2, the broadcast control signal causing any of the switches SW_A to SW_D that correspond to the corresponding input/output ports to make a transition from the OFF state to the ON state.

The route switching circuit 2 controls switching of the switches among the switches SW_A to SW_D that are set in correspondence to the broadcast control signal. Then, the route switching circuit 2 performs switching so that the connection of the data input and output circuit of any one of the selected input/output ports is changed from the data buses (DA, DB, DC, DD) to the broadcast data line B/C. At this time, the input/output ports other than the selected one are in connection with the data buses (DA, DB, DC, DD).

With the aforementioned route switching of the route switching circuit 2 by the route control circuit 3, routes in a one-to-p broadcast write mode where data that is input from a single input/output port is written to a plurality of memory banks are established. At this time, the route control circuit 3 controls the crossbar switch portions of the crossbar switch group so that the command signals and the address signals are transmitted to the selected memory banks.

When the broadcast write command shown in FIG. 6A is input from any of the input/output ports, the route control circuit 3 prohibits access from the outside to the port, of the input/output ports that are associated with the memory banks specified as those for data write, except the port(s) to which the broadcast write command has been input. Then, to the arbitration circuit 4, the route control circuit 3 outputs the port number of the input/output port to which data is input and an arbitration signal for putting the input/output port in the input state.

When the above arbitration signal is input, the arbitration circuit 4 prohibits access from the outside to the specified input/output port, and also puts the specified input/output port in the input state in order to input data to be written to the specified memory banks.

At this time, by means of the crossbar switch portions of the crossbar switch group, the route control circuit 3 controls routes between the input/output ports that are not specified as a data input target and the memory bank(s) that is/are not specified as a write target in correspondence to normal access.

On the other hand, when the memory bank(s) specified as a data write target is/are accessed by the input/output port(s) not specified as a data input target, the route control circuit 3 makes a comparison with internally stored addresses. As a result, the route control circuit 3 detects a plurality of accesses, and outputs a busy signal to the input/output port(s) not specified as a data input target.

Figure 7:
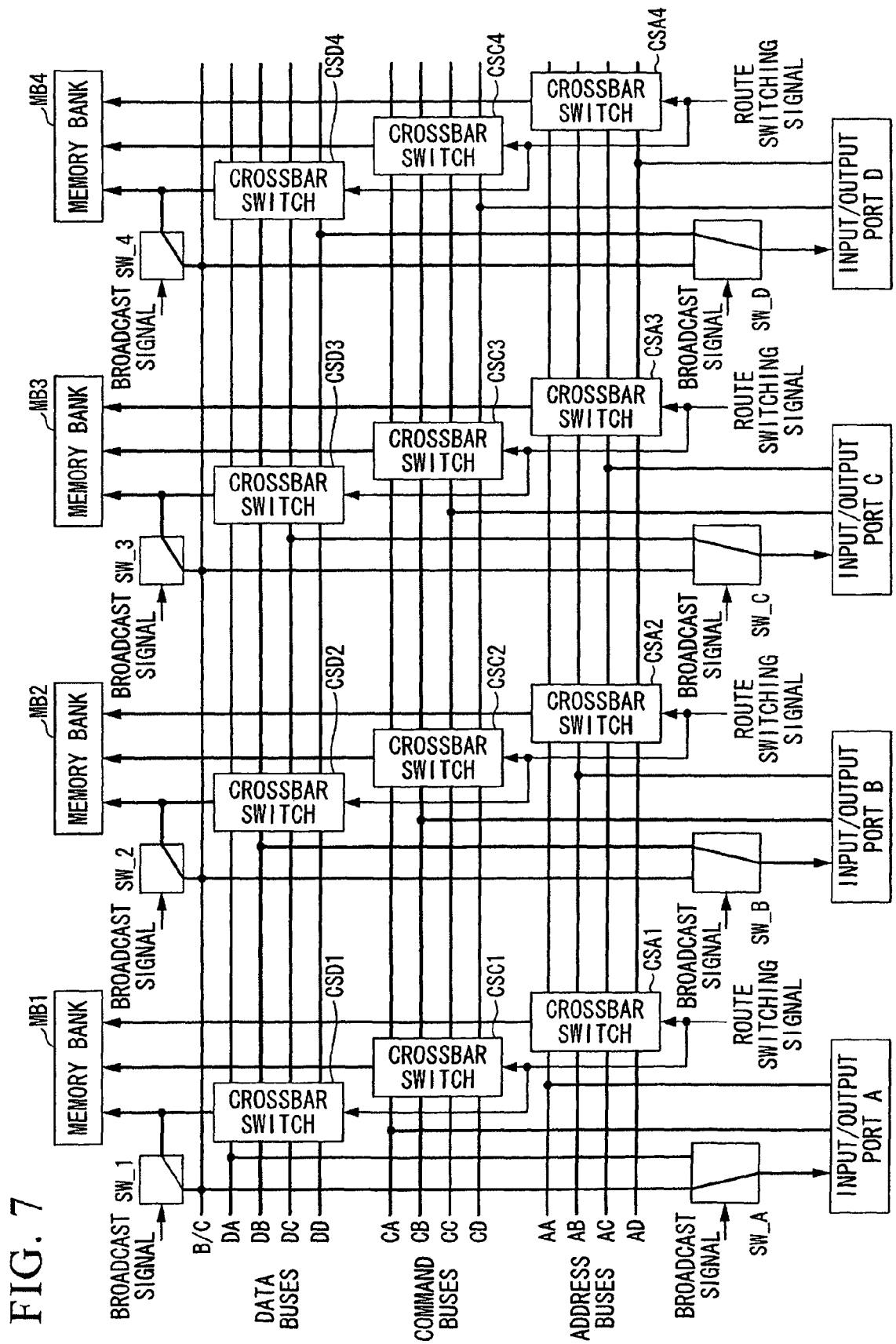
FIG. 7 is a conceptual diagram for explaining a process of writing data to a plurality of optional memory banks, the data being input from an optional single input/output port.

FIG. 7 shows a state of the switches SW_1 to SW_4 and SW_A to SW_D when a broadcast write command of [C0, C1, MB1, MB2, MB3, MB4]=[1, 0, 1, 1, 1, 1] is input from the input/output port A, the broadcast write command denoting the direction of writing the data that has been input from the input/output port A to all the memory banks MB1 to MB4.

With the broadcast control signal (switch on-off signal) from the route control circuit 3, the switches SW_1, SW_2, SW_3, and SW_4 are all in the ON state in the route switching circuit 2. As a result, the data input and output lines of the memory banks MB1, MB2, MB3, and MB4 are connected to the broadcast data line B/C.

Furthermore, with the broadcast control signal (switch selector signal) from the route control circuit 3, the switch SW_A switches the connection to the data input and output circuits in the route switching circuit 2 so that the data input and output circuit of the input/output port A is connected to the broadcast data line B/C.

With the arbitration signal from the route control circuit 3, the arbitration circuit 4 prohibits access from the outside to the ports of the input/output ports associated with the specified memory banks MB1 to MB4, except the port A to which the broadcast write command has been input. Furthermore, the arbitration circuit 4 puts the specified input/output port A in the input state in order to input the data to be written to the specified memory banks MB1 to MB4.

As a result, the data that has been input from the input/output port A is transmitted simultaneously to all the memory banks MB1 to MB4, leading to writing of the same data.

Figure 8:
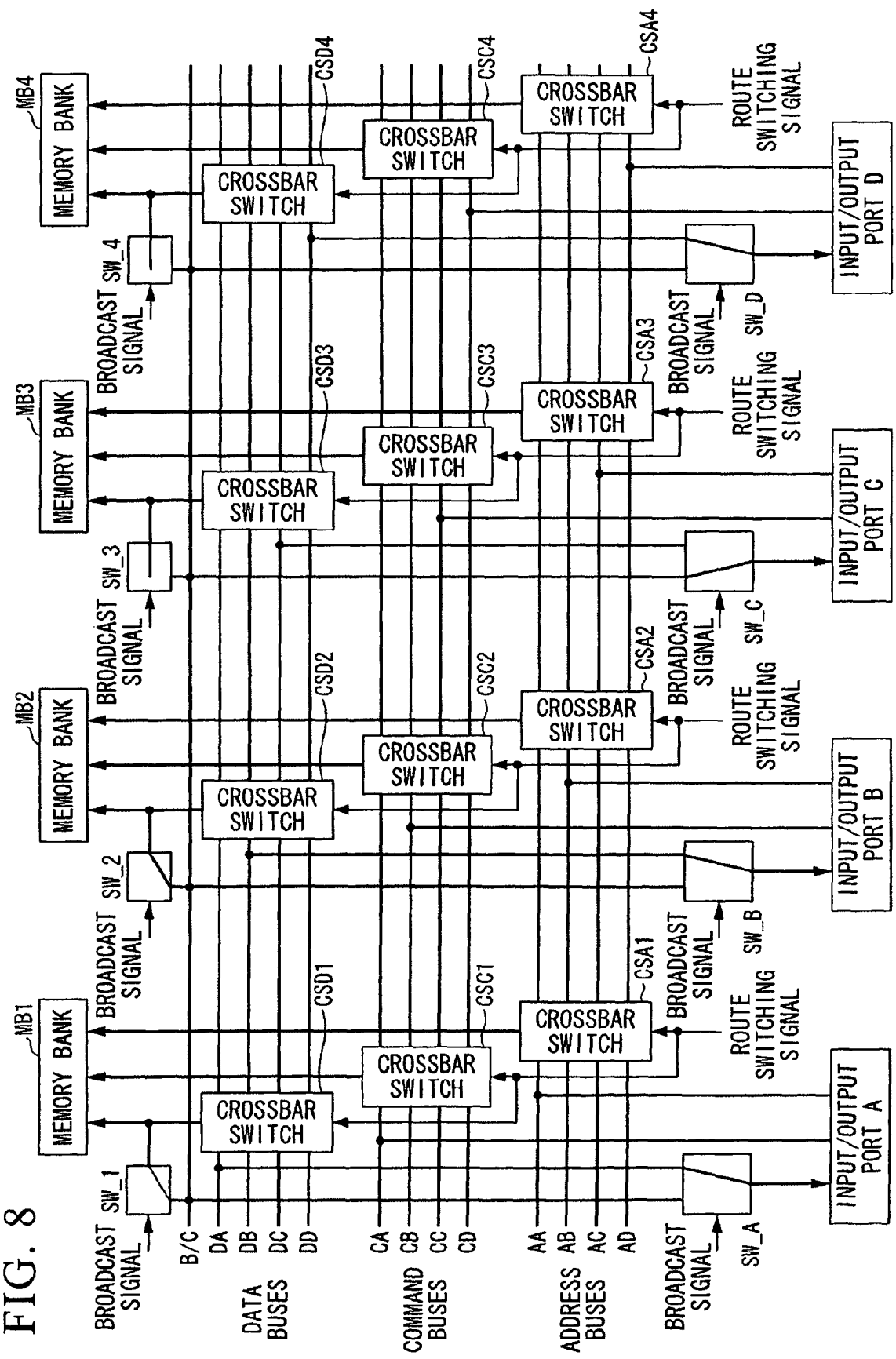
FIG. 8 is a conceptual diagram for explaining another process of writing data to a plurality of optional memory banks, the data being input from an optional single input/output port.

FIG. 8 shows a state of the switches SW_1 to SW_4 and SW_A to SW_D when a broadcast write command of [C0, C1, MB1, MB2, MB3, MB4]=[1, 0, 1, 1, 0, 0] is input from the input/output port C, the broadcast write command denoting the direction of writing the data that has been input from the input/output port C to the memory banks MB1 and MB2.

With the broadcast control signal (switch on-off signal) from the route control circuit 3, the switches SW_1 and SW_2 are put in the ON state in the route switching circuit 2. As a result, the data input and output lines of the memory banks MB1 and MB2 are connected to the broadcast data line B/C.

Furthermore, with the broadcast control signal (switch selector signal) from the route control circuit 3, the switch SW_C switches the connection to the data input and output circuit in the route switching circuit 2 so that the data input and output circuit of the input/output port C is connected to the broadcast data line B/C.

With the arbitration signal from the route control circuit 3, the arbitration circuit 4 prohibits access from the outside to the ports of the input/output ports associated with the memory banks MB1 and MB2, except the port C to which the broadcast write command has been input. Furthermore, the arbitration circuit 4 puts the specified input/output port C in the input state in order to input the data to be written to the specified memory banks MB1 and MB2.

As a result, the data that has been input from the input/output port C is transmitted simultaneously to the memory banks MB1 and MB2, leading to writing of the same data to both.

Furthermore, in the case of the broadcast write mode of FIG. 8, it is possible to form normal signal routes between the memory banks MB3, and MB4 and the input/output ports A, B, D. Thus, the control of the crossbar switch portions by the route control circuit 3 allows for normal access between the memory banks MB3, and MB4 and the input/output ports A, B, D.

Figure 9A:
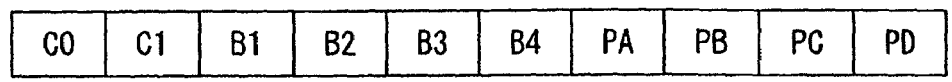
FIG. 9A shows one example of a command signal of the present embodiment.
Figure 9B:
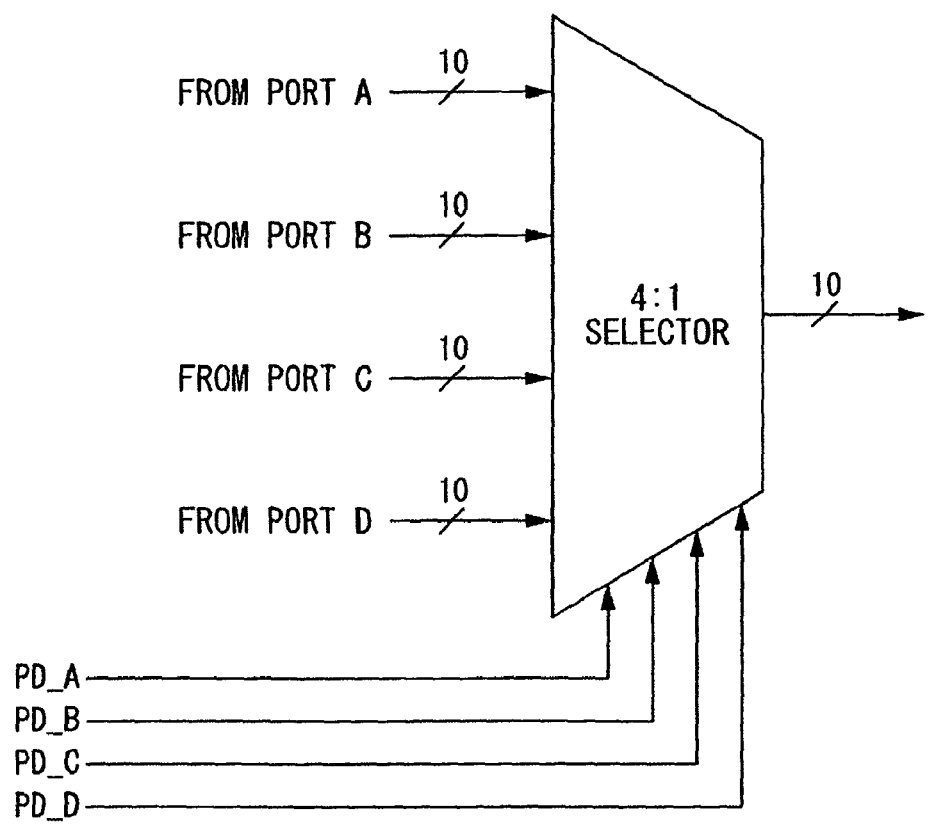
FIG. 9B is a block diagram for explaining a circuit portion that selects a command signal for setting a broadcast mode in a route control circuit 3.

Next is a description of the circuit portion for selecting a command signal that sets a broadcast mode in the route control circuit 3 of FIG. 3B and FIG. 6B, with reference to FIG. 9A and FIG. 9B.

The command signals of the present embodiment are 10-bit wide broadcast command signals that are input from the input/output ports A, B, C, and D (see FIG. 9A). However, in the case of the broadcast write command, four bits of PA, PB, PC, and PD are not used, and hence treated as don't care.

A 4:1 selector of FIG. 9B selects the above broadcast command signals that are input from the ports by use of signals PD_A, PD_B, PD_C, and PD_D as selection signals, the signals PD_A, PD_B, PD_C, and PD_D being for identifying the input/output ports to which the command signals are input. The 4:1 selector then outputs the broadcast command signals selected by the selection signals to a broadcast signal generation circuit (circuit of FIG. 10, which will be described later) in the next stage. The signals PD_A, PD_B, PD_C, and PD_D take either a value of "0" or "1" where "0" denotes an input/output port that has not issued a command and "1" denotes an input/output port that has issued a command.

Figure 10:
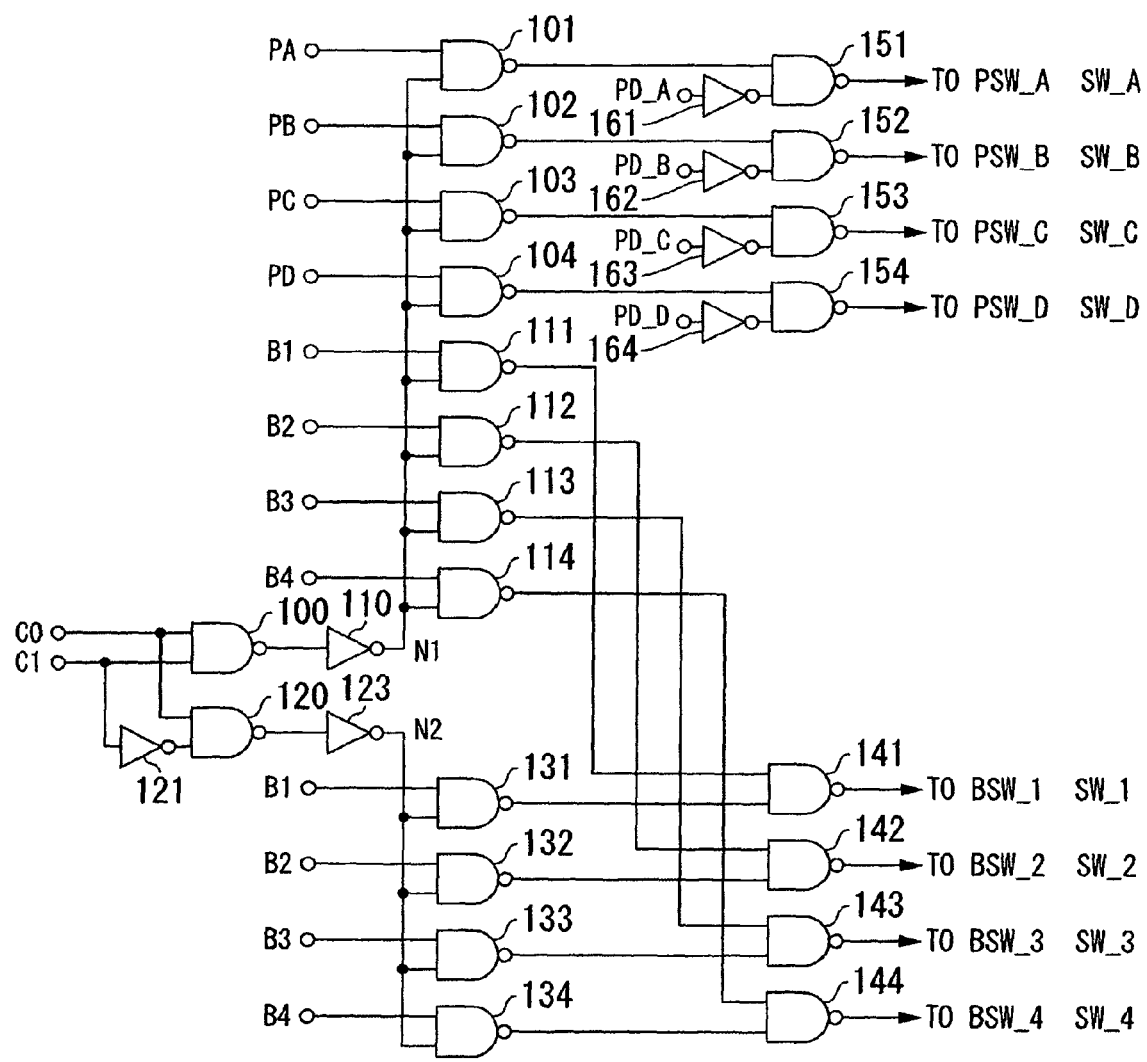
FIG. 10 is a block diagram for explaining a broadcast generation circuit that generates a broadcast signal in the route control circuit 3.

FIG. 10 shows the above broadcast generation circuit in a portion that generates a broadcast signal in the route control circuit 3 shown in FIG. 3B and FIG. 6B.

If the W/R control codes C0 and C1 are both "1 (H level)," the operation mode is for broadcast read.

In the aforementioned case, the output of a NAND circuit 100 is in the "L" level, and the output of an inverter 110 is in the "H" level. As a result, a node N1 is in the "H" level, and NAND circuits 101, 102, 103, 104 and NAND circuits 111, 112, 113, 114 are in the enabled state.

On the other hand, the output of an inverter 121 is in the "L" level, and the output of an inverter 123 is in the "L" level. Thereby, a node N2 is in the "L" level. This puts NAND circuits 131, 132, 133, and 134 in the disabled state, with the outputs thereof in the "H" level.

As a result, NAND circuits 141, 142, 143, and 144 are in the enabled state.

Any of the B1, B2, B3, and B4 that specify which memory bank is read is "1," that is, in the "H" level. Therefore, any of the NAND circuits 111, 112, 113, and 114 is in the "L" level.

As a result, any of the switch on-off signals (in the broadcast control signals) BSW_1, BSW_2, BSW_3, and BSW_4 that are output respectively from the NAND circuits 141, 142, 143, and 144 is in the "H" level. Thereby, any of the switches SW_1, SW_2, SW_3, and SW_4 in the route switching circuit 2 is changed from the OFF state to the ON state.

On the other hand, in correspondence to signals A, B, C, and D that denote input/output ports PA, PB, PC, and PD to be read being turned to the "H level," the outputs of the NAND circuits 101, 102, 103, and 104 are in the "L" level. As a result, the NAND circuits 151, 152, 153, and 154 to which the "L" level is input from the NAND circuits 101, 102, 103, and 104 turn switch selector signals PSW_A, PSW_B, PSW_C, and PSW_D, as the outputs, to the "H" level.

As a result, the switches SW_A, SW_B, SW_C, and SW_D corresponding to the input/output ports to be read switch the connection target of the input and output circuits of data of the input/output ports from the data buses to the broadcast data line B/C.

Here, the signals PD_A, PD_B, PD_C, and PD_D for identifying the input/output ports are input in the "H" level so that the switches (SW_A, SW_B, SW_C, SW_D) corresponding to the input/output ports to which the broadcast read signal has been input are inevitably turned to the "H" level. As a result, the outputs of the inverters 161 to 164 are in the "L" level, and the outputs of the corresponding NAND circuits of the NAND circuits 151 to 154 are in the "H" level.

If the W/R control code C0 is "1 (H level)" and the W/R control code C1 is "0 (L level)," the operation mode is for broadcast write.

In this case, the W/R control code C1 is inverted by the inverter 121. This puts the output of the NAND circuit 120 in the "L" level, and the output of the inverter 123 in the "H" level. As a result, the node N2 is in the "H" level, and the NAND circuits 131, 132, 133, and 134 are in the enabled state. At this time, the output of the NAND circuit 100 is in the "H" level, and the output of the inverter 110 is in the "L" level.

As a result, the NAND circuits 101 to 104 and the NAND circuits 111 to 114 are in the disabled state. The outputs of the NAND circuits 101 to 104 and the NAND circuits 111 to 114 are in the "H" level. The NAND circuits 141 to 144 and the NAND circuits 151 to 154 are in the enabled state.

In the aforementioned configuration, the signals B1 to B4 denoting memory banks to which the same data is written are in the "H" level. Therefore, the corresponding switch on-off signals BSW_1 to BSW_4 are in the "H" level, to thereby respectively control the switches SW_1 to SW_4.

On the other hand, any one of the signals PD_A to PD_D denoting the input/output ports that have issued the broadcast write command is in the "H" level. Therefore, the corresponding signal of the switches PSW_A to PSW_D is in the "H" level, to thereby control the switching of the switches SW_A to SW_D.

Figure 11:
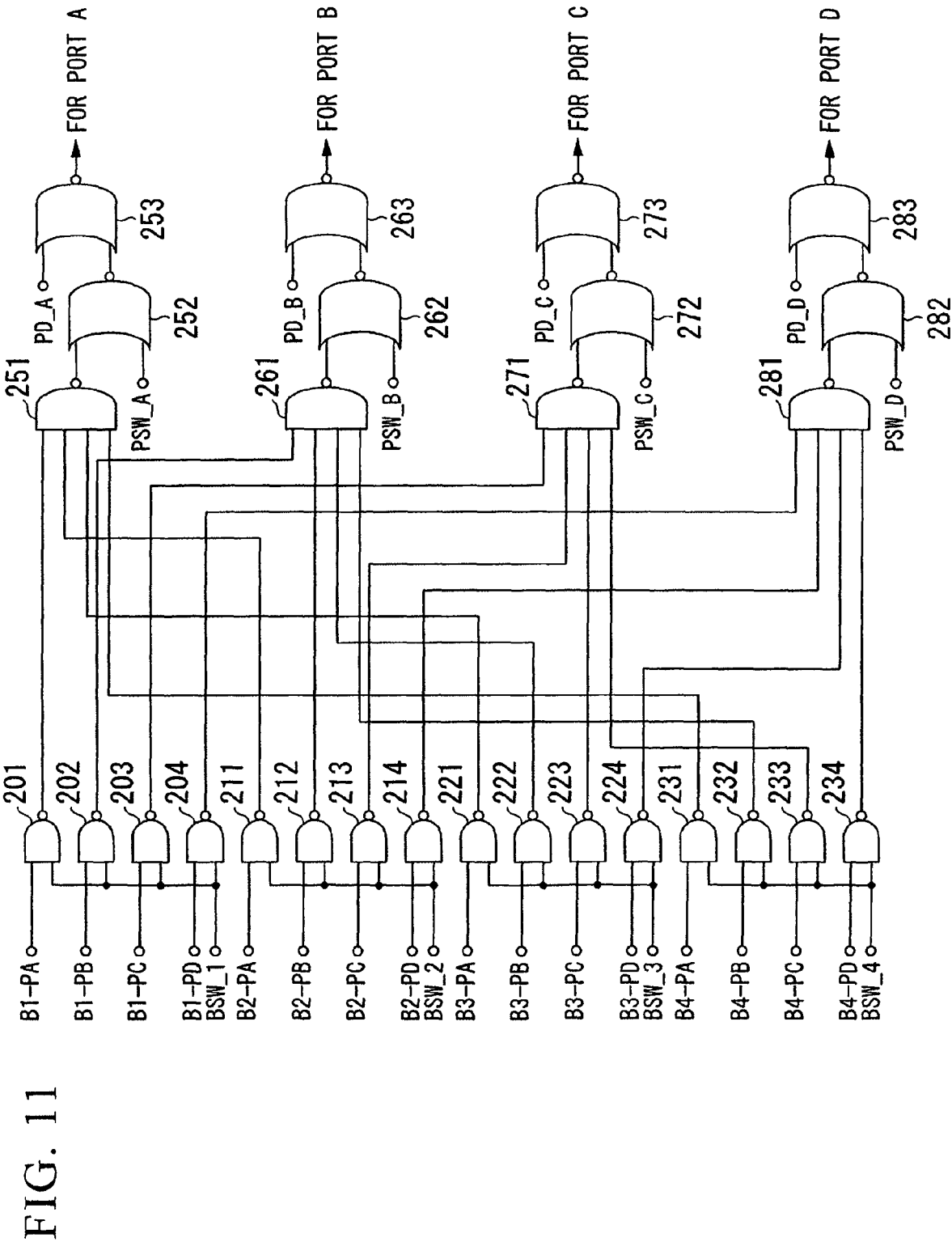
FIG. 11 is a block diagram for explaining a circuit portion that generates an arbitration signal in the route control circuit 3.

Next, FIG. 11 shows a circuit of a portion that generates arbitration signals for arbitrating the input/output ports in the route control circuit 3 shown in FIG. 3B and FIG. 6B.

The portion that generates an arbitration signal to the input/output port A is made of: NAND circuits 201, 211, 221, 231, 251; and NOR circuits 252, 253.

The portion that generates an arbitration signal to the input/output port B is made of: NAND circuits 202, 212, 222, 232, 261; and NOR circuits 262, 263.

The portion that generates an arbitration signal to the input/output port C is made of: NAND circuits 203, 213, 223, 233, 271; and NOR circuits 272, 273.

The portion that generates an arbitration signal to the input/output port D is made of: NAND circuits 204, 214, 224, 234, 281; and NOR circuits 282, 283.

From a route switching control circuit not shown in the figure, a port-bank correspondence signal is input, the signal being current connection information between the input/output ports and the memory banks.

As for the above port-bank correspondence signal, a signal corresponding to a combination where an input/output port and a memory bank are connected is in the "H" level, and the others in the "L" level.

For example, with attention focused on the portion that generates an arbitration signal to the input/output port A, the switch on-off signals BSW_1, BSW_2, BSW_3, and BSW_4 are respectively input to the NAND circuits 201, 211, 221, and 231.

If any of the port-bank correspondence signals corresponding to the port A is turned to the "H" level, and any of the switch on-off signals BSW_1 to BSW_4 that is input to the NAND circuit to which the port-bank correspondence signal at "H" level is input is turned to the "H" level, that is, the corresponding memory bank is connected to the broadcast data line B/C, then any of the NAND circuits (201, 211, 221, and 231) outputs the "L" level, the output of the NAND circuit 251 is in the "H" level, and the output of the NOR circuit 252 is in the "L" level.

If the port A is not the input/output port that has issued the broadcast command (that is, the input/output port to which the broadcast signal has been input from the outside), then the command issuing port identification signal PD_A is in the "L" level. As a result, the arbitration signal to the input/output port A that is associated with the memory bank connected to the broadcast data line B/C is in the "H" level.

Here, for example, B1-PA is a port-bank correspondence signal that corresponds between the memory bank MB1 and the input/output port A. If a route for data transfer has been formed between the memory bank MB1 and the input/output port A, then B1-PA is turned to the "H" level by the route switching control circuit.

If the switch selector signals PSW_A to PSW_D are in the "H" level, that is, the corresponding input/output port is connected to the broadcast data line B/S, and if the input/output port is not the input/output port that has issued the broadcast command (that is, the input/output port to which the broadcast signal has been input from the outside), then the arbitration signal for the input/output port is also in the "H" level.

However, if the signals PD_A to PD_D denoting the input/output port to which the command is input are in the "H" level, then the arbitration signal corresponding to the input/output port that has issued the broadcast command is in the "L" level in spite of the above. For example, if the signal PD_A is input at the "H" level, the output of the NOR circuit 253 is in the "L" level.

As a result of these, the mode is turned to either broadcast read or broadcast write where the switch on-off signal is in the "H" level, or the switch selector signal is in the "H" level, except for the input/output ports that have issued the command. For the input/output ports related to the memory banks specified at that time, the arbitration signal is in the "H" level. Therefore, access to these input/output ports is prohibited.

As described above, the arbitration circuit 4 shown in FIG. 1 conducts arbitration with the arbitration signal from the route control circuits 3 so that access to the input/output ports from the outside circuit (MPU or CPU core) is prohibited.

Furthermore, the arbitration circuit 4 conducts arbitration between required input/output ports also in a normal operation other than in the operation modes of the broadcasts. However, that case is not directly related to the present embodiment. Therefore, a detailed description of such operation is omitted.

Second Embodiment

Figure 12:
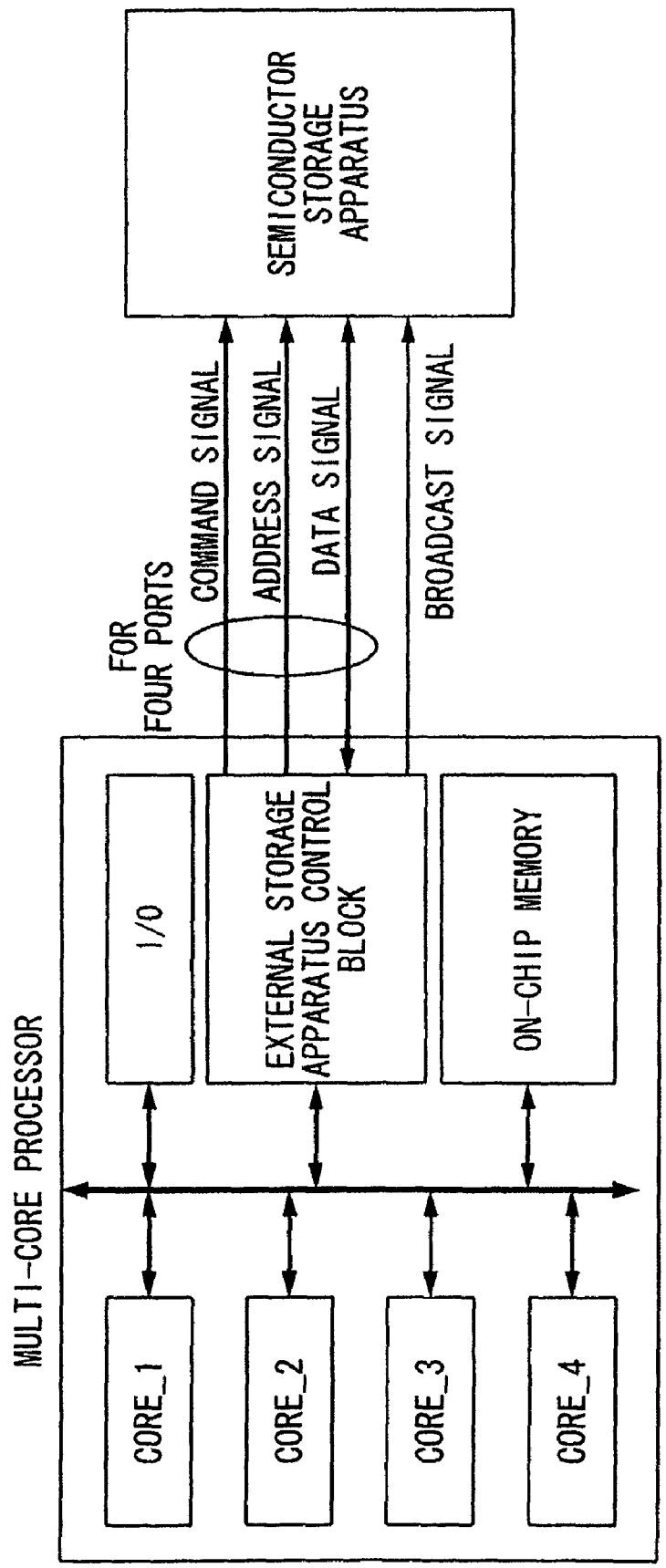
FIG. 12 is a block diagram showing a configuration of a computer system using a multi-port memory and a multi-core processor according to a second embodiment.

FIG. 12 is a block diagram showing an exemplary configuration of a computer system according to a second embodiment, the computer system made of: the multi-port memory of the first embodiment (semiconductor storage apparatus of FIG. 12); and a multi-core processor. Here, the multi-core processor has, for example, four CPU cores.

In the configuration of the computer system of the present embodiment, the multi-port memory of the first embodiment is an external storage apparatus for the above multi-core processor.

Furthermore, an external storage apparatus control block in the chip of the multi-core processor controls the multi-port memory.

For example, the external storage apparatus control block performs control of allocating each of the four CPU cores of the multi-core processor to each of the four input/output ports of the multi-port memory.

From an optional single CPU core of the four CPU cores, it is possible to write the same data simultaneously to a plurality of optional memory banks via the allocated input/output port in the broadcast mode in a manner as described in the first embodiment.

Conversely, an optional single memory bank is accessed, and the data read from this memory bank is broadcast-transferred to a plurality of optional CPU cores via the corresponding input/output port. Thus, it is possible to simultaneously transfer the same data read from a single memory bank.

Third Embodiment

Figure 13:
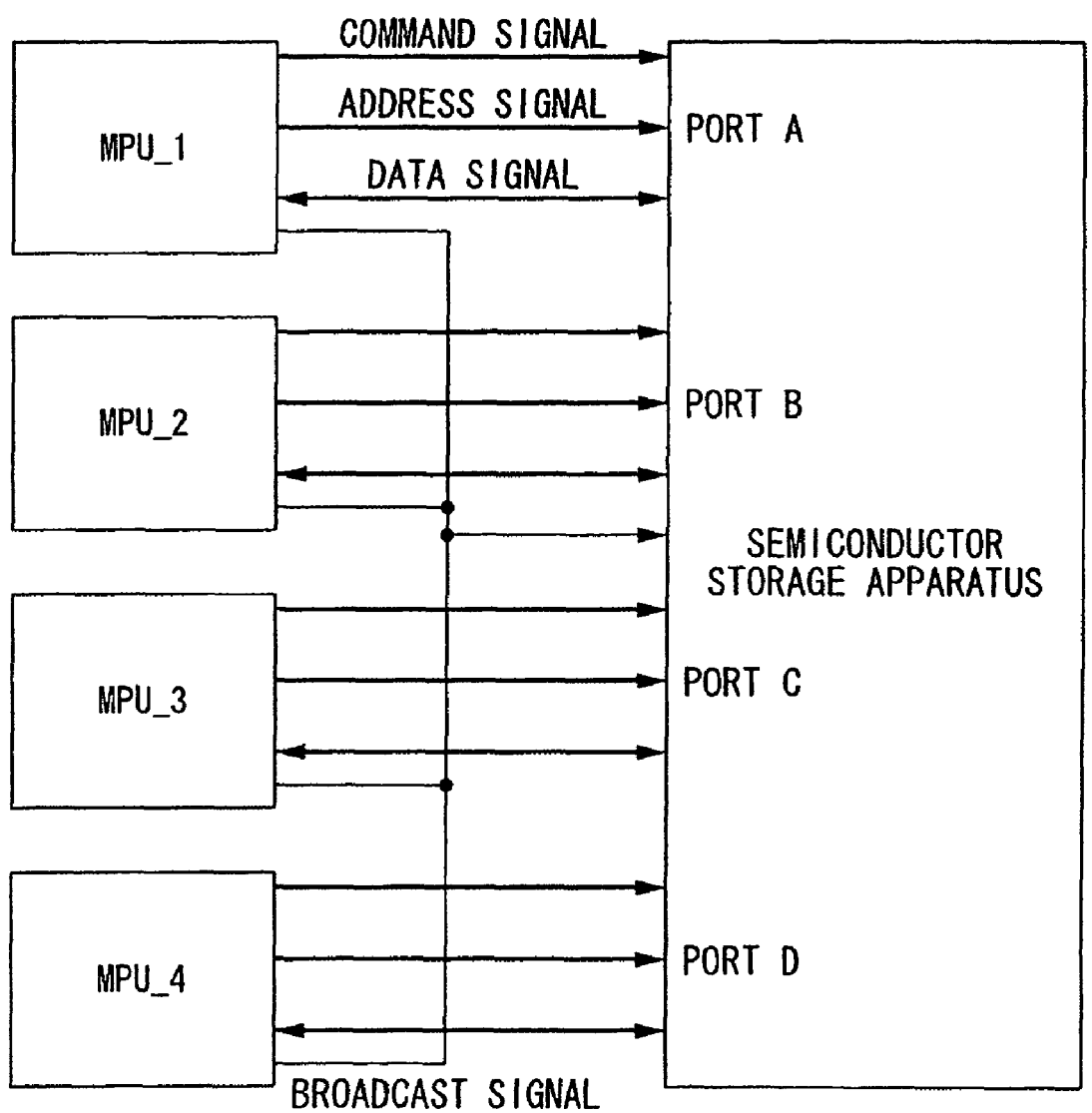
FIG. 13 is a block diagram showing a configuration of a computer system using a multi-port memory and a plurality of processors according to a third embodiment.

FIG. 13 is a block diagram showing an exemplary configuration of a computer system made of: four processors MPU_1, MPU_2, MPU_3, and MPU_4; and the multi-port memory (semiconductor storage apparatus) of the first embodiment.

In the configuration of the computer system of the present embodiment, each of the four multi-port memory ports is allocated to each of the four processors on a one-on-one basis.

From an optional single processor of the four processors, it is possible to write the same data simultaneously to a plurality of optional memory banks via the allocated input/output port in the broadcast mode in a manner as described in the first embodiment.

Conversely, an optional single memory bank is accessed, and the data read from this memory bank is broadcast-transferred to a plurality of optional processors via the corresponding input/output port. Thus, it is possible to simultaneously transfer the same data read from a single memory bank.

As described above, according to the multi-port memory (semiconductor storage apparatus) of the prescribed embodiments, it is possible to allocate a plurality of banks to a plurality of MPUs or CPU cores, and is possible to implement simultaneous writing of the same data to a plurality of memory banks, in which data that is input from a single MPU or a single CPU core, that is, any of the input/output ports is written to a plurality of memory banks. Furthermore, conversely to this, it is possible to implement a function of simultaneous reading of the same data from a plurality of input/output ports, in which data that is read from a single memory bank is output to a plurality of MPUs or CPU cores.

As a result, according to the multi-port memory of the prescribed embodiments, in a system including a plurality of MPUs or a multi-core processor, when common data is written from a single MPU or a single CPU core to a plurality of memory banks, the number of operations of reading and then writing the same data to a plurality of memory banks that require a write is reduced by the number of the memory banks. Therefore, it is possible to increase the rate of operation of computation in data processing of a CPU, and to improve efficiency in data processing of a system.

Furthermore, similarly, according to the multi-port memory of the prescribed embodiments, in a system including a plurality of MPUs or a multi-core processor, when common data is read from a single memory bank to a plurality of MPUs or CPU cores, the number of operations of reading and then outputting the same data to the input/output ports of a plurality of MPUs or CPU cores that require a read is reduced by the number of the MPUs or CPU cores. Therefore, it is possible to increase the rate of operation of computation in data processing of a CPU, and to improve efficiency in data processing of a system.

A computer system described above may be adapted to a computer system which uses single-core processor.

What is claimed is:
1. A multi-port memory, comprising:
  a memory array made of a plurality of memory cells arranged at intersection points between a plurality of bit lines and a plurality of word lines, the memory array being divided into n (an integer of 2 or greater) memory banks;
  m (an integer of 2 or greater) input/output ports, each independently performing inputs and outputs of a command, an address, and data to and from each of the memory banks; and
  a route switching circuit that sets signals for the command, address, and data between the memory banks and the input/output ports, the route switching circuit control- ling a connection state of signal lines between the plurality of input/output ports and the plurality of memory banks,
wherein the route switching circuit further comprises a broadcast switch portion,
the broadcast switch portion comprising:
a broadcast data line;
first switches each provided for each of the memory banks for connecting the broadcast data line with an input and output line of each of the memory banks; and
second switches each provided for each of the input/output ports for connecting the broadcast data line with an input and output circuit of each of the input/output ports,
wherein, on receiving a command denoting a control of setting a route for a broadcast data transfer, which is a transfer of the same data from any of the input/output ports to p (an integer of $2 \leq p \leq n$) of the memory banks,
the first switches corresponding to the plurality of memory banks are put in an ON state, one of the second switches corresponding to the input/output port selected for performing data input is put in an ON state, and the other of the second switches are put in an OFF state.

2. A multi-port memory, comprising:
a memory array made of a plurality of memory cells arranged at intersection points between a plurality of bit lines and a plurality of word lines, the memory array being divided into n (an integer of 2 or greater) memory banks;
m (an integer of 2 or greater) input/output ports, each independently performing inputs and outputs of a command, an address, and data to and from each of the memory banks; and
a route switching circuit that sets signals for the command, address, and data between the memory banks and the input/output ports, the route switching circuit controlling a connection state of signal lines between the plurality of input/output ports and the plurality of memory banks,
wherein the route switching circuit further comprises a broadcast switch portion,
the broadcast switch portion comprising:
a broadcast data line;
first switches each provided for each of the memory banks for connecting the broadcast data line with an input and output line of each of the memory banks; and
second switches each provided for each of the input/output ports for connecting the broadcast data line with an input and output circuit of each of the input/output ports,
wherein, on receiving a command denoting a control of setting a route for broadcast data transfer, which is a transfer of the same data from any of the memory banks to q (an integer of $2 \leq q \leq m$) of the input/output ports,
the second switches corresponding to the plurality of input/output ports are put in an ON state, one of the first switches corresponding to the memory bank selected for performing data output is put in an ON state, and the other of the first switches are put in an OFF state.

3. A device comprising:
a plurality of memory banks each including a set of input/output nodes;
a plurality of data buses;
a broadcast bus;
a plurality of input/output ports each including a set of input/output nodes;
a plurality of first switches each configured to control an electrical connection between the set of input/output nodes of an associated one of the memory banks and a selected one of the data buses;
a plurality of second switches each configured to control an electrical connection between the set of input/output nodes of an associated one of the input/output ports and a selected one of the broadcast bus and an associated one of the data buses; and
a plurality of third switches each configured to control an electrical connection between the broadcast bus and the set of input/output nodes of an associated one of the memory banks.

4. The device as claimed in claim 3, wherein when the second switch belonging to one of the input/out ports forms an electrical connection between the set of input/output nodes of the one of the input/output ports and the broadcast bus, each of at least two of the third switches forms an electrical connection between the broadcast bus and the set of input/output nodes of an associated one of the memory banks to allow the one of the input/output ports to write date into at least two of the memory banks via the broadcast bus.

5. The device as claimed in claim 4, wherein each of the second switches belonging to the at least two of the memory banks electrically disconnects the set of input/out nodes of an associated one of the at least two of the memory banks from any one of the data buses.

6. The device as claimed in claim 4, further comprising an arbitration circuit that prohibits a remaining one or ones of the input/output ports from accessing to the at least two of the memory banks until the one of the input/output ports complete writing data into the at least two of the memory banks via the broadcast bus.

7. The device as claimed in claim 3, wherein when the third switch belonging to one of the memory banks forms an electrical connection between the set of input/output nodes of the one of the memory banks and the broadcast bus, each of at least two of the second switches forms an electrical connection between the broadcast bus and the set of input/output nodes of an associated one of the input/output ports to allow at least two of the input/output ports to receive data read out from the one of the memory banks via the broadcast bus.

8. The device as claimed in claim 7, wherein the second switch belonging to the one of the memory banks electrically disconnects the set of input/out nodes of the one of the memory banks from any one of data buses.

9. The device as claimed in claim 7, further comprising an arbitration circuit that prohibits a remaining one or ones of the input/output ports from accessing to the one of the memory banks until the one of the memory banks completes reading data from the one of the memory banks to the at least two of the input/output ports via the broadcast bus.

10. The device as claimed in claim 3, wherein each of the first switches forms an electrical connection between the set of input/output nodes of an associated one of the memory banks and a selected one of the data buses when the selected one of the data buses is electrically connected to the set of input/output nodes of an associated one of the input/output ports through the second switch belonging to the selected one of the data buses.

11. The device as claimed in claim 3, further comprising a plurality of CPU cores each coupled to an associated one of the input/output ports to supply command and address information to the associated one of the input/output ports for data transfer therebetween.

12. The device as claimed in claim 3, wherein the first, second and third switches are configured to provide a selected one of first, second and third operation modes, the first operation mode being such that each of the input/output ports reads or writes data from or into a selected one of the memory banks via an associated one of the data buses, the second operation mode being such that a selected one of the input/output ports writes data into a selected one or more of the memory banks via the broadcast bus, the third operation being such that a selected one or more of the input/output ports receive data read out from a selected one of the memory banks via the broadcast bus.

13. The device as claimed in claim 12, wherein in at least one of the second and third operation modes, a remaining one or ones of the input/output ports are allowed to read or write data from or into a remaining one or ones of the memory banks via an associated one or ones of the data buses.

14. The device as claimed in claim 12, wherein in each of the second and third operation modes, a remaining one or ones of the input/output ports are allowed to read or write data from or into a remaining one or ones of the memory banks via an associated one or ones of the data buses.

15. The device as claimed in claim 3, wherein the first, second and third switches are configured to provide a selected one of first, second and third operation modes, the first operation mode being such that each of the input/output ports reads or writes data from or into a selected one of the memory banks via an associated one of the data buses, the second operation mode being such that a selected one of the input/output ports writes data into selected two or more of the memory banks via the broadcast bus in parallel to each other, the third operation being such that selected two or more of the input/output ports receive data read out from a selected one of the memory banks via the broadcast bus in parallel to each other.

16. The device as claimed in claim 15, wherein in at least one of the second and third operation modes, a remaining one or ones of the input/output ports are allowed to read or write data from or into a remaining one or ones of the memory banks via an associated one or ones of the data buses.

17. The device as claimed in claim 15, wherein in each of the second and third operation modes, a remaining one or ones of the input/output ports are allowed to read or write data from or into a remaining one or ones of the memory banks via an associated one or ones of the data buses.

\* \* \* \* \*